United States Patent
Beyerlein

(10) Patent No.: US 8,112,274 B2
(45) Date of Patent: *Feb. 7, 2012

(54) METHOD OF DETERMINING MODEL-SPECIFIC FACTORS FOR PATTERN RECOGNITION, IN PARTICULAR FOR SPEECH PATTERNS

(75) Inventor: Peter Beyerlein, Aachen (DE)

(73) Assignee: Nuance Communications, Inc., Burlington, MA (US)

( * ) Notice: Subject to any disclaimer, the term of this patent is extended or adjusted under 35 U.S.C. 154(b) by 1655 days.

This patent is subject to a terminal disclaimer.

(21) Appl. No.: 10/135,336

(22) Filed: Apr. 30, 2002

(65) Prior Publication Data

US 2002/0165714 A1    Nov. 7, 2002

Related U.S. Application Data

(63) Continuation of application No. 09/367,214, filed on Aug. 10, 1999, now Pat. No. 6,456,969.

(30) Foreign Application Priority Data

Dec. 12, 1997 (DE) .................................. 197 55 191
Nov. 6, 1998 (EP) ..................................... 98203725

(51) Int. Cl.
*G10L 15/06* (2006.01)

(52) U.S. Cl. ...................................... 704/234; 704/240

(58) Field of Classification Search .......... 704/232–234, 704/237, 239, 240, 243–245
See application file for complete search history.

(56) References Cited

U.S. PATENT DOCUMENTS

| 5,412,738 A | | 5/1995 | Brunelli et al. ............... 382/115 |
| 5,675,706 A | * | 10/1997 | Lee et al. ...................... 704/256 |
| 5,680,481 A | | 10/1997 | Prasad et al. .................. 382/190 |
| 5,721,808 A | * | 2/1998 | Minami et al. ................ 704/256 |
| 6,456,969 B1 | * | 9/2002 | Beyerlein ...................... 704/234 |

* cited by examiner

Primary Examiner — Susan McFadden
(74) Attorney, Agent, or Firm — Sunstein Kann Murphy & Timbers LLP

(57) ABSTRACT

A method for recognizing a pattern that comprises a set of physical stimuli, said method comprising the steps of:
providing a set of training observations and through applying a plurality of association models ascertaining various measuring values $p_j(k|x)$, $j=1 \ldots M$, that each pertain to assigning a particular training observation to one or more associated pattern classes;
setting up a log/linear association distribution by combining all association models of the plurality according to respective weight factors, and joining thereto a normalization quantity to produce a compound association distribution;
optimizing said weight factors for thereby minimizing a detected error rate of the actual assigning to said compound distribution;
recognizing target observations representing a target pattern with the help of said compound distribution.

11 Claims, 1 Drawing Sheet

METHOD OF DETERMINING MODEL-SPECIFIC FACTORS FOR PATTERN RECOGNITION, IN PARTICULAR FOR SPEECH PATTERNS

CROSS REFERENCE TO RELATED APPLICATIONS

This is a continuation of application Ser. No. 09/367,214, filed Aug. 10, 1999 now U.S. Pat. No. 6,456,969.

BACKGROUND OF THE INVENTION

The invention relates to a method for recognizing a pattern that comprises a set of physical stimuli, said method comprising the steps of:
providing a set of training observations and through applying a plurality of association models ascertaining various measuring values $p_j(k|x)$, $j=1 \ldots M$, that each pertain to assigning a particular training observation to one or more associated pattern classes;
setting up a log/linear association distribution by combining all association models of the plurality according to respective weight factors, and joining thereto a normalization quantity to produce a compound association distribution.

The invention has been conceived for speech recognition, but is likewise applicable to other recognition processes, such as for speech understanding, speech translation, as well as for recognizing handwriting, faces, scene recognition, and other environments. The association models may be probability models that give probability distributions for assigning patterns to classes. Other models can be based on fuzzy logic, or similarity measures, such as distances measured between target and class. Known technology has used different such models in a combined recognition attack, but the influences lent to the various cooperating models were determined in a haphazard manner. This meant that only few and/or only elementary models were feasible.

The present inventor has recognized that the unification of Maximum-Entropy and Discriminative Training principles would in case of combination of more than one model in principle be able to attain superior results as compared with earlier heuristic methods. Also, a straightforward data processing procedure should provide a cheap and fast road to those results.

In consequence, amongst other things, it is an object of the invention to evaluate a log-linear combination of various 'sub'models $p_j(k|X)$ whilst executing parameter evaluation through discriminative training. Now, according to one of its aspects, the invention attains the object by recognizing a pattern that comprises a set of physical stimuli, said method comprising the steps of:
providing a set of training observations and through applying a plurality of association models ascertaining various measuring values $p_j(k|x)$, $j=1 \ldots M$, that each pertain to assigning a particular training observation to one or more associated pattern classes;
setting up a log/linear association distribution by combining all association models of the plurality according to respective weight factors, and joining thereto a normalization quantity to produce a compound association distribution;
optimizing said weight factors for thereby minimizing a detected error rate of the actual assigning to said compound distribution;
recognizing target observations representing a target pattern with the help of said compound distribution. Inter alia, such procedure allows to combine any number of models into a single maximum-entropy distribution. Furthermore, it allows an optimized interaction of models that may vary widely in character and representation.

The invention also relates to a method for modelling an association distribution according to the invention. This provides an excellent tool for subsequent users of the compound distribution for recognizing appropriate patterns.

The invention also relates to a method for recognizing patterns using a compound distribution produced by the invention. This method has users benefitting to a great deal by applying the tool realized by the invention.

The invention relates to a system that is arranged for practising a method according to the invention. Further aspects are recited in dependent Claims.

BRIEF DESCRIPTION OF THE DRAWING

These and other aspects and advantages of the invention will be discussed more in detail with reference to the detailed disclosure of preferred embodiments hereinafter, and in particular with reference to the appended Figures that show.

DETAILED DISCLOSURE OF PREFERRED EMBODIMENTS

Figure 1:
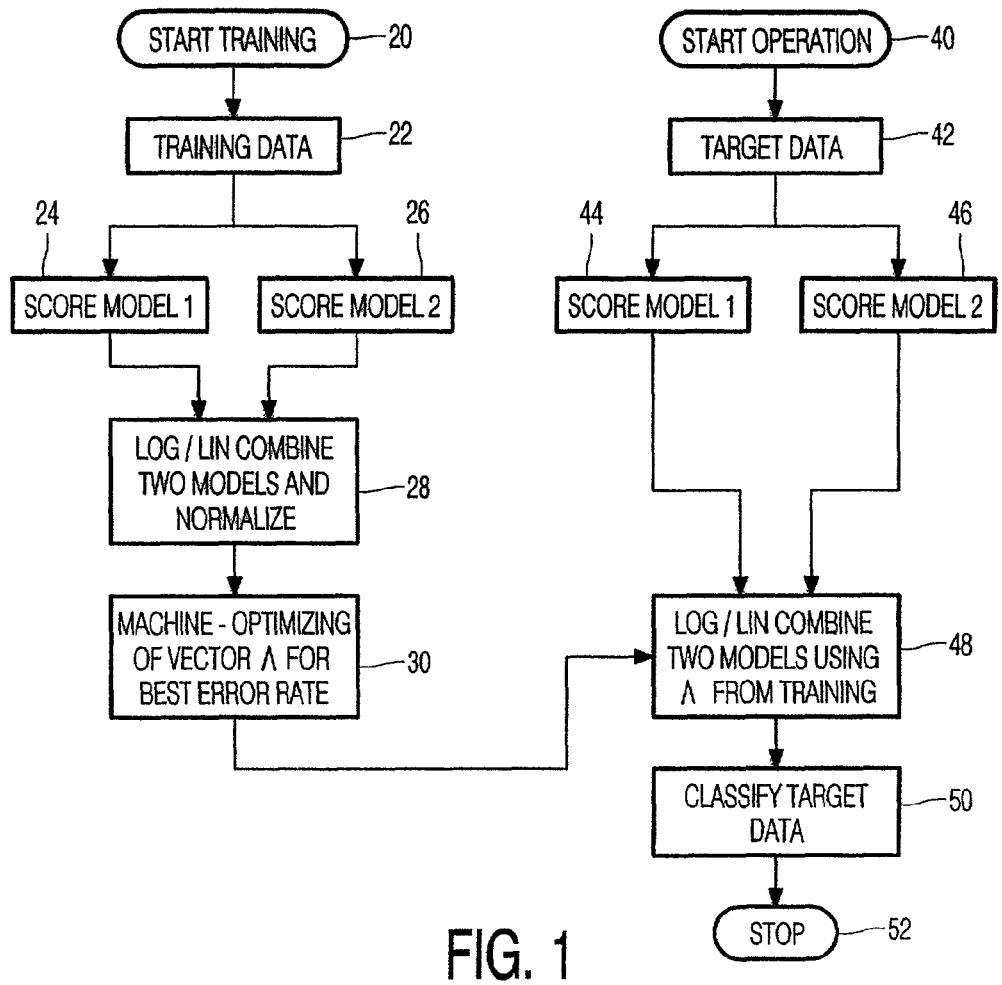
FIG. 1, an overall flow chart of the method.

The invention being based on a balanced application of mathematics on the handling and accommodating of physical quantities that may be of very diverse character, much of the disclosure is based on advanced mathematics. However, both the starting point and the eventual outcome have permanently physical aspects and relevance. The speech recognition may be used to control various types of machinery. Scene analysis may guide unmanned vehicles. Picture recognition may be used for gate control. Various other applications are evident per se. The expressions hereinafter are numbered in sequence, and will be referred to in the text by these numbers.

The invention determines model-specific factors in order to combine and optimize several different models into a single pattern recognition process, notably for speech recognition.

The statistical speech recognition method utilizes Bayes' decision theory in order to form an identification mechanism with a minimum error rate. In conformity with this theory, the decision rule is such, that an observation x must be assigned to the class k (x∈k for brevity), when for a given a posteriori or "real" probability distribution $\pi(k|x)$ it holds that:

$$\forall k' = 1, \ldots, K; k' \neq k : \log \frac{\pi(k|x)}{\pi(k'|x)} \geq 0 = > x \varepsilon k \quad (1)$$

In literature, the term $\log(\pi(k|x)/\pi(k'|x))$ is called the discriminant function. Hereinafter, this term will be noted g(x, k,k') will be used for brevity. When the decision rule (1) is used for recognizing complete sentences, observed expressions $x_1^T=(x^1, \ldots x^T)$, that have a temporal length T, will be classified as spoken word sequences $w_1^S=(w^1, \ldots w^S)$ of length S. The a posteriori distribution $\pi(w_1^S|x_1^T)$ is however unknown since it describes the complicated natural speech communication process of humans. Consequently, it must be approximated by a distribution $p(w_1^S|x_1^T)$. Thus far, the acoustic-phonetic and grammatical modelling of speech in the form of parametric probability distributions have attained the best results. The form of the distribution $p(w_1^S|x_1^T)$ is then predetermined; the unknown parameters of the distribution are estimated on the basis of training data. The distribution $p(w_1^S|x_1^T)$ so acquired is subsequently inserted into Bayes' decision rule. The expression $x_1^T$ is then assigned to the word sequence $w_1^S$ for which:

$$\forall w_1^{s'} \neq w_1^s : \log \frac{p(w_1^s|x_1^T)}{p(w_1^{s'}|x_1^T)} > 0 \quad (2)$$

Conversion of the discriminant function $$g(s_1^T, w_1^s, w_1^{s'}) = \log \frac{p(w_1^s|x_1^T)}{p(w_1^{s'}|x_1^T)} \quad (3)$$

$$= \log \frac{p(w_1^s)p(x_1^T|w_1^s)}{p(w_1^{s'})p(x_1^T|w_1^{s'})},$$

allows to separate the grammatical model $p(w_1^S)$ from the acoustic-phonetic model $p(x_1^T|w_1^S)$ in a natural way. The grammatical model $p(w_1^S)$ then describes the probability of occurrence of the word sequence $w_1^S$ per se, and the acoustic-phonetic model $p(x_1^T|w_1^S)$ evaluates the probability of occurrence of the acoustic signal $x_1^T$ during the uttering of the word sequence $w_1^S$. Both models can then be estimated separately, so that an optimum use can be made of the relatively limited amount of training data. The decision rule (3) could be less than optimum due to a deviation of the distribution p from the unknown distribution π, even though the estimation of the distribution p was optimum. This fact motivates the use of so-called discriminative methods. Discriminative methods optimize the distribution p directly in respect of the error rate of the decision rule as measured empirically on training data. The simplest example of such discriminative optimization is the use of the so-called language model factor λ. The equation (3) is then modified as follows:

$$g(x_1^T, w_1^s, w_1^{s'}) = \log \frac{p(w_1^s)^\lambda p(x_1^T|w_1^s)}{p(w_1^{s'})^\lambda p(x_1^T|w_1^{s'})} \quad (4)$$

Experiments show that the error rate incurred by the decision rule (4) decreases when choosing λ>1. The reason for this deviation from theory, wherein x=1, lies in the incomplete or incorrect modelling of the probability of the compound event $(w_1^s, x_1^T)$. The latter is inevitable, since the knowledge of the process generating the event $(w_1, x_1^T)$ is incomplete.

Many acoustic-phonetic and grammatical language models have been analyzed thus far. The object of these analyses was to find the "best" model for the relevant recognition task out of the set of known or given models. All models determined in this manner are however imperfect representations of the real probability distribution, so that when these models are used for pattern recognition, such as speech recognition, incorrect recognitions occur as incorrect assignment to classes.

It is an object of the invention to provide a modelling, notably for speech, which approximates the real probability distribution more closely and which nevertheless can be carried out while applying only little processing effort, and in particular to allow easy integration of a higher number of known or given models into a single classifier mechanism.

SUMMARY OF THE INVENTION

The novel aspect of the approach is that it does not attempt to integrate known speech properties into a single acoustic-phonetic distribution model and into a single grammatical distribution model which would involve complex and difficult training. The various acoustic-phonetic and grammatical properties are now modeled separately and trained in the form of various distributions $p_j(w_1^S|x_1^T)$, j=1 ... M, followed by integration into a compound distribution $$p_{(\Lambda)}^\pi = (w_1^s|x_1^T)$$

$$= C(\Lambda) \cdot \prod_{j=1}^{M} p_j((w_1^s|x_1^T))^{\lambda_j} \quad (5)$$

$$= \exp\left\{\log C(\Lambda) + \sum_{j=1}^{M} \lambda_j \log p_j(w_1^s|x_1^T)\right\}$$

The effect of the model $p_j$ on the distribution $p^\pi_{\{\Lambda\}}$ is determined by the associated coefficient $\lambda_j$.

The factor C(·) ensures that the normalization condition for probabilities is satisfied. The free coefficients $\Lambda = (\lambda_1, \ldots \lambda_M)^{tr}$ are adjusted so that the error rate of the resultant discriminant function $$g(x_1^T, w_1^s, w_1^{s'}) = \log \frac{\prod_{j=1}^{M} p_j((w_1^s|x_1^T))^{\lambda_j}}{\prod_{j=1}^{M} p_j((w_1^{s'}|x_1^T))^{\lambda_j}} \quad (6)$$

is as low as possible. There are various possibilities for implementing of this basic idea, several of which will be described in detail hereinafter.

First of all, various terms used herein will be defined. Each word sequence $w_1^S$ forms a class k; the sequence length S may vary from one class to another. A speech utterance $x_1^T$ is considered as an observation x; its length T may then differ from one observation to another.

Training data is denoted by the references $(x_n, k)$, with n=1, ..., N; k=0, ..., K. Herein N is the number of acoustic training observations $x_n$, and $k_n$ is the correct class associated with the observation $x_n$. Further, $k \neq k_n$ are the various incorrect rival classes that compete with respect to $k_n$.

The classification of the observation x into the class k in conformity with Bayes' decision rule (1) will be considered. The observation x is an acoustic realization of the class k. In the case of speech recognition, each class k symbolizes a sequence of words. However, the method can be applied more generally.

Because the class $k_n$ produced by the training observation $x_n$ is known, an ideal empirical distribution π(k|x) can be constructed on the basis of the training data $(x_n, k)$; n=1 ... N; k=0 ... K. This distribution should be such that the decision rule derived therefrom has a minimum error rate when applied to the training data. In the case of classification of complete word sequences k, a classification error through selecting an erroneous word sequence $k \neq k_n$, may lead to several word errors. The number of word errors between the incorrect class k and the correct class $k_n$ is called the Levenshtein distance $E(k, k_n)$. The decision rule formed from $E(k, k_n)$ has a minimum word error rate when a monotony property is satisfied.

The ideal empirical distribution $\hat{\pi}$ is a function of the empirical error value $E(k, k_n)$ which is given only for the training data, but is not defined with respect to unknown test data, because the correct class assignment is not given in that case. Therefore, on the basis of this distribution there is sought a distribution $$p^{\pi}\{\Lambda\}(k|x) = \frac{\exp\left\{\sum_{j=1}^{M} \lambda_j \log p_j(k|x)\right\}}{\sum_{k'=1}^{K} \exp\left\{\sum_{j=1}^{M} \lambda_j \log p_j(k'|x)\right\}} \quad (7)$$

which is defined over arbitrary, independent test data and has an as low as possible empirical error rate on the training data. If the M predetermined distribution models $p_1(k|x), \ldots, p_M(k|x)$, are defined on arbitrary test data, the foregoing also holds for the distribution $p^{\pi}\{\Lambda\}(k|x)$. When the freely selectable coefficients $\cdot = (\lambda 1, \ldots \lambda_M)^{tr}$ (8) are determined in such a manner that $p^{\pi}\{\Lambda\}(k|x)$ on the training data has a minimum error rate, and if the training data is representative, $\pi_{\{\Lambda\}}(k|x)$ should yield an optimum decision rule also on independent test data.

The GPD method as well as the least mean square method optimize a criterion which approximates the mean error rate of the classifier. In comparison with the GPD method, the least mean square method offers the advantage that it yields a closed solution for the optimum coefficient $\cdot$.

The least mean square method will first be considered. Because the discriminant function (1) determines the quality of the classifier, the coefficients $\cdot$ should minimize the root mean square deviation $$\frac{1}{(K-1)N} \sum_{n=1}^{N} \sum_{k \neq k_n} \left(\log \frac{p_\Lambda(k|x_n)}{p_\Lambda(k_n|x_n)} - E(k_n, k)\right)^2 =$$

$$\frac{1}{(K-1)N} \sum_{n=1}^{N} \sum_{k \neq k_n} \left(\sum_j \lambda_j \log \frac{p_j(k|x_n)}{p_j(k_n|x_n)} - E(k_n, k)\right)^2$$

of the discriminant functions of the distributions $p^{\pi}_{\{\Lambda\}}(k|x)$ from the empirical error rate $E(k, k_n)$. The summing over r then includes all rival classes in the criterion. Minimizing D (·) leads to a closed solution for the optimum coefficient vector $\Lambda = Q^{-1}P$ (9), further detailed by $$Q_{i,j} = \frac{1}{(K-1)N} \sum_{n=1}^{N} \sum_{k \neq k_n} \left\{\log \frac{p_i(k_n|x_n)}{p_i(k|x_n)}\right\} \left\{\log \frac{p_j(k_n|x_n)}{p_j(k|x_n)}\right\}$$

and

-continued $$P_i = \frac{1}{(K-1)N} \sum_{n=1}^{N} \sum_{k \neq k_n} E(k_n, k) \left\{\log \frac{p_i(k_n|x_n)}{p_i(k|x_n)}\right\}$$

Herein, Q is the autocorrelation matrix of the discriminant functions of the predetermined distribution models. The vector P expresses the relationship between the discriminant functions of the predetermined models and the discriminant function of the distribution $\hat{\pi}$.

The word error rate $E(k, k_n)$ of the hypotheses k is thus linearly taken up in the coefficients $\lambda_1, \ldots, \lambda_M$. Conversely, the discrimination capacity of the distribution model $p_i$ is linearly included in the coefficients $\lambda_1, \ldots, \lambda_M$ for determining the coefficients directly via the discriminant function log $$\log \frac{p_i(k|x_n)}{p_i(k_n|x_n)}.$$

Alternatively, these coefficients can be determined by using the GPD method. With this method, the smoothed empirical error rate $E(\cdot)$:

$$E(\Lambda) = \frac{1}{N} \sum_{n=1}^{N} l(x_n, k_n, \Lambda) \quad (10)$$

$$l(x_n, k_{n0}, \Lambda) = \left(1 + A \left(\frac{1}{K} \sum_{r=1}^{K} \exp\left\{-\eta \log \frac{p^{\pi}_{\{\Lambda\}}(k_n|x_n)}{p^{\pi}_{\{\Lambda\}}(k|x_n)}\right\}\right)^{-\frac{B}{\eta}}\right)^{-1} \quad (11)$$

can be directly minimized for the training data. The left hand expression is then a smoothed measure for the error classification risk of the observation $x_n$. The values $A>0$, $B>0$, $\eta>0$ determine the type of smoothing of the error classification risk and should be suitably predetermined. When $E(\lambda)$ is minimized in respect of the coefficient $\lambda$ of the log linear combination, the following iteration equation with the step width M is obtained for the coefficients $\lambda_j$, wherein $j=1, \ldots, M$.

$\lambda_j^{(0)} = 1$ (11), and furthermore according to $$y_{nk}(\Lambda) = \left(\frac{p_\Lambda(k|x_n)}{p_\Lambda(k_n|x_n)}\right)^{E(k_n,k)}, \text{ and}$$

$$\frac{1}{(K-1)N} \sum_{n=1}^{N} \sum_{k \neq k_n} \left(\log \frac{p_\Lambda(k|x_n)}{p_\Lambda(k_n|x_n)} - E(k_n, k)\right)^2 =$$

$$\frac{1}{(K-1)N} \sum_{n=1}^{N} \sum_{k \neq k_n} \left(\sum_j \lambda_j \log \frac{p_j(k|x_n)}{p_j(k_n|x_n)} - E(k_n, k)\right)^2$$

$$\Lambda^{(l)} = (\lambda_1^{(l)}, \ldots, \lambda_M^{(l)})^{tr}; j = 1, \ldots, M$$

It is to be noted that the coefficient vector $\Lambda$ is included in the criterion $E(\cdot)$ by way of the discriminant function $$\log \frac{p_{\{\Lambda\}}^{\pi}(k_n|x_n)}{p_{\{\Lambda\}}^{\pi}(k|x_n)} \qquad (12)$$

If $E(\cdot)$ decreases, the discriminant function (12) should increase on average because of (9) and (10). This results in a further improved decision rule, see (1).

In the above, the aim has been to integrate all available knowledge sources into a single pattern recognition system. Two principles are united. The first is the maximum-entropy principle. This works by introducing as few assumptions as possible, so that uncertainty is maximized. Thus, exponential distributions must be used. In this manner the structure of the sources combination is defined. The second principle is discriminative training, to determine the weighting factors assigned to the various knowledge sources, and the associated models. Through optimizing the parameters, the errors are minimized. For speech, models may be semantic, syntactic, acoustic, and others.

The approach is the log-linear combining of various submodels and the estimating of parameters through discriminative training. In this manner, the adding of a submodel may improve the recognition score. If not, the model in question may be discarded. A submodel can however never decrease the recognition accuracy. In this manner, all available submodels may be combined to yield optimum results. Another application of the invention is to adapt an existing model combination to a new recognition environment.

The theoretical approach of the procedure includes various aspects:
  parabolic smoothing of the empirical error rate
  simplifying the theory of "minimum error rate training"
  providing a closed form solution that needs no iteration sequence.

The invention furthermore provides extra facilities:
  estimating an optimum language model factor
  applying a log-linear Hidden Markov Model
  closed form equations for optimum model combination
  closed form equations for discriminative training of class-specific probability distributions.

Now for the classification task specified in (1), the true or posterior distribution $\pi(k|x)$ is unknown but approximated by a model distribution $(p(k|x))$. The two distribution differ, because of incorrect modelling assumptions and because of insufficient data. An example is the language model factor $\lambda$ used in.

$$\log \frac{\pi(x|k) \cdot \pi(k)}{\pi(x|k') \cdot \pi(k')} \rightarrow \log \frac{p(x|k) \cdot p(k)^\lambda}{p(x|k') \cdot p(k')^\lambda}$$

The formal definition combines various submodels $p_j(k|x)$, $j=1 \ldots M$ into a log-linear posterior distribution $p_{\{\cdot\}}(k|x)=\exp\{..\}$ as given in (5). Next to the log-linear combination of the various submodes, the term $\log C(\cdot)$ allows normalization to attain a formal probability distribution. The resulting discriminant function is $$\log \frac{p_{\{\Lambda\}}(k|x)}{p_{\{\Lambda\}}(k'|x)} = \sum_j \lambda_j \log \frac{p_j(k|x)}{p_j(k'|x)} \qquad (13)$$

The error rate is minimized and $\Lambda$ optimized. Optimizing on the sentence level is as follows:
  Class k: word sequence
  Observation x: spoken utterance (e.g. sentence)
  N training samples $x_n$, giving the correct sentence
  For each sample x,
    $k_n$: correct class as spoken
    $k \neq k_n$: rival classes, which may be all possible sentences, or for example, a reasonable subset thereof.
  Similarity of classes: $E(k_n, k)$
  E: suitable function of Levenshthein-Distance, or a similarly suitable measure that is monotonous.
  Number of words in wordsequence $k_n$: $L_n$.
  Now, equation $$\frac{1}{\sum_{n=1}^{N} L_n} \sum_{n=1}^{N} E\left(\arg\max_k \left(\log \frac{p_\Lambda(k|x_n)}{p_\Lambda(k_n|x_n)}\right), k_n\right) =$$

$$\frac{1}{\sum_{n=1}^{N} L_n} \sum_{n=1}^{N} \sum_{k \neq k_n} E(k_n, k) \cdot \delta\left(k, \arg\max_{k'}\left(\log \frac{p_\Lambda(k'|x_n)}{p_\Lambda(k_n|x_n)}\right)\right)$$

gives an objective function, the empirical error rate. Herein, the left hand side of the equation introduces the most probable class that bases on the number of erroneous deviations between classes k and $k_n$.

The parameters $\Lambda$ may be estimated by:
  a minimum error rate training through Generalized Probabilistic Descent, which yields an iterative solution.
  a modification thereof combines with parabolic smoothing, which yields a closed form solution.
  a third method bases on least squares, which again yields a closed form solution.

For the GPD method, the smoothed empirical error rate minimizing is based on.

$$L(\Lambda) = \frac{1}{N} \sum_{n=1}^{N} l(x_n, \Lambda)$$

The smoothed misclassification risk is given by, $$l(x_n, \Lambda) = \frac{1}{1 + AR_n(\Lambda)^{-B}}$$

and the average rivalry by.

$$R_n(\Lambda) = \left(\frac{1}{K-1} \sum_{k \neq k_n}\left(e^{E(k_n,k) \cdot \sum_{j=1}^{M} \lambda_j \log \frac{p_j(k|x_n)}{p_j(k_n|x_n)}}\right)^\eta\right)^{\frac{1}{\eta}}$$

The smooth empirical error ate is minimized through.

$$L(\Lambda) = \frac{1}{N} \sum_{n=1}^{N} l(x_n, \Lambda)$$

Herein, l is a loss function that for straightforward calculations must be differentiatable. Rivalry is given by, $$y_{nk}(\Lambda) = \left(\frac{p_\Lambda(k|x_n)}{p_\Lambda(k_n|x_n)}\right)^{E(k_n,k)}$$

wherein E indicates the number of errors. Average rivalry is given through the summing in.

$$R_n(\Lambda) = \left(\frac{1}{K-1} \sum_{k \neq k_n} [y_{nk}(\Lambda)]^\eta\right)^{\frac{1}{\eta}}$$

A smoothed misclassification risk is used by $$l(x_n, \Lambda) = \frac{1}{1 + A R_n(\Lambda)^{-B}}$$

that behaves like a sigmoid function. For $R_n = -\infty$, l becomes zero, for $R_n = +\infty$, the limiting value is l=1. Herein A, B are scaling constants greater than zero. Differentiating to - yields, $$\lambda_j^{(I+1)} = \lambda_j^{(I)} - \varepsilon \sum_{n=1}^{N} l(x_n, \Lambda^{(I)})(1 - l(x_n, \Lambda^{(I)})) \times$$
$$\frac{\sum_{k \neq k_n} E(k_n, k) \log\left(\frac{p_j(k|x_n)}{p_j(k_n|x_n)}\right) [y_{nk}(\Lambda^{(I)})]^\eta}{\sum_{k \neq k_n} [y_{nk}(\Lambda^{(I)})]^\eta}$$

wherein the vector $\Lambda^{(I)}$ is given by $$\Lambda^{(I)} = (\lambda_1^{(I)}, \ldots, \lambda_M^{(I)})^{tr}$$

and the eventual outcome by $$y_{nk}(\Lambda) = \left(\frac{p_\Lambda(k|x_n)}{p_\Lambda(k_n|x_n)}\right)^{E(k_n,k)}$$

The invention also provides a closed form solution for finding the discriminative model combination DMC. The solution is to minimize the distance between on the one hand the discriminant function and on the other hand the ideal discriminant function $E(k_n,k)$ in a least squares method. The basic expression is given by $$\frac{1}{(K-1)N} \sum_{n=1}^{N} \sum_{k \neq k_n} \left(\log \frac{p_\Lambda(k|x_n)}{p_\Lambda(k_n|x_n)} - E(k_n, k)\right)^2 =$$

-continued $$\frac{1}{(K-1)N} \sum_{n=1}^{N} \sum_{k \neq k_n} \left(\sum_j \lambda_j \log \frac{p_j(k|x_n)}{p_j(k_n|x_n)} - E(k_n, k)\right)^2$$

Herein, $\Lambda = Q^{-1}P$, wherein Q is a matrix with elements $Q_{i,j}$ given by $$Q_{i,j} = \frac{1}{(K-1)N} \sum_{n=1}^{N} \sum_{k \neq k_n} \left\{\log \frac{p_i(k_n|x_n)}{p_i(k|x_n)}\right\} \left\{\log \frac{p_j(k_n|x_n)}{p_j(k|x_n)}\right\}$$

Furthermore, P is a vector with elements $P_i$ given by, $$P_i = \frac{1}{(K-1)N} \sum_{n=1}^{N} \sum_{k \neq k_n} E(k_n, k) \left\{\log \frac{p_i(k_n|x_n)}{p_i(k|x_n)}\right\}$$

Now, the empirical error rate has been given earlier in $$\frac{1}{\sum_{n=1}^{N} L_n} \sum_{n=1}^{N} E\left(\arg\max_k \left(\log \frac{p_\Lambda(k|x_n)}{p_\Lambda(k_n|x_n)}\right), k_n\right) =$$

$$\frac{1}{\sum_{n=1}^{N} L_n} \sum_{n=1}^{N} \sum_{k \neq k_n} E(k_n, k) \cdot \delta\left(k, \arg\max_{k'} \left(\log \frac{p_\Lambda(k'|x_n)}{p_\Lambda(k_n|x_n)}\right)\right)$$

For calculatory reasons this is approximated by a smoothed empirical error rate as expressed by $$\frac{1}{\sum_{n=1}^{N} L_n} \sum_{n=1}^{N} \sum_{k \neq k_n} E(k, k_n) \cdot S\left(\log \frac{p_\Lambda(k|x_n)}{p_\Lambda(k_n|x_n)}\right)$$

Herein, an indication is given on the number of errors between k and $k_n$ through using a sigmoid function S or a similarly useful function. A useful form is $S(x) = \{(x+B)/(A+B)\}^2$, wherein $-B < x < A$ and $-B < 0 < A$. for higher values of x, S=1, and for lower values S=0. This parabola has proved to be useful. Various other second degree curves have been found useful. The relevant rivals must now lie in the central and parabolically curved interval of S. Now, finally, a normalization constraint is added for $\Lambda$ according to $$\sum_{j=1}^{M} \lambda_j = 1$$

The second criterion is solved according to a matrix equation $(\alpha, \lambda^{tr})^{tr} = Q'^{-1}P'$, wherein an additional row and column have been supplemented to matrix Q' for normalization reasons, according to $Q'_{0,0} = 0$; $Q'_{0,j} = 1$, $Q'_{i,0} = 1/2(A+B)^2$. The general element of correlation matrix Q' has been given in $$Q'_{i,j} = \frac{1}{(K-1)N} \sum_{n=1}^{N} \sum_{k \neq k_n} E(k, k_n) \left\{ \log \frac{p_i(k_n | x_n)}{p_i(k | x_n)} \right\} \left\{ \log \frac{p_j(k_n | x_n)}{p_j(k | x_n)} \right\}$$

Note that the closed solution is rendered possible through the smoothed step function s. Furthermore, vector P' likewise gets a normalizing element $P'_0=1$, whereas its general element is given by.

$$P'_0 = 1$$

$$P'_i = \frac{B}{(K-1)N} \sum_{n=1}^{N} \sum_{k \neq k_n} E(k, k_n) \left\{ \log \frac{p_i(k_n | x_n)}{p_i(k | x_n)} \right\}$$

Experiments have been done with various M-gram language models, such as bigram, trigram, fourgram or tetragram models, various acoustic models, such as word-internal-triphone, cross-word-trigram and pentaphone models. Generally, the automatic DMC procedure performs equally well as the results produced by non-automatic fine tuning using the same set of submodels. However, the addition of extra submodels according to the automatic procedure of the invention allowed to decrease the number of errors by about 8%. This is considered a significant step forward in the refined art of speech recognition. It is expected that the invention could provide similarly excellent results for recognizing other types of patterns, such as signatures, handwriting scene analysis, and the like, given the availability of appropriate sub-models. Other submodels used for broadcast recognition included mllr adaptation, unigram, distance-1 bigram, wherein an intermediate element is considered as don't care, pentaphones and wsj-models. In this environment, raising the number of submodels in the automatic procedure of the invention also lowered the numbers of errors by a significant amount of 8-13%.

FIG. 1 shows an overall flow chart of a method according to the invention. In block 20 the training is started on a set of training data or patterns that is provided in block 22. The start as far as necessary claims required software and hardware facilities; in particular, the various submodels and the identity of the various patterns is also provided. For simplicity, the number of submodels has been limited to 2, but the number may be higher. In parallel blocks 24 and 26, the scores are determined for the individual submodels. In block 28 the log-lin combination of the various submodels is executed and normalized. In block 30 the machine optimizing of vector - in view of the lowest attainable error rate is executed. Note that vector - may have one or more zero-valued components to signal that the associated submodel or -models would bring about no improvement at all.

Next, the vector - and the various applicable submodels will be used for recognizing target data, as shown in the right half of the Figure. The training at left, and the usage at right may be executed remote from each other both in time and in space; for example a person could have a machine trained to that person's voice at a provider's premises. This might require extra data processing facilities. Later, the machine so trained may be used in a household or automobile environment, or other. Thus, blocks 40-46 have corresponding blocks at left.

In block 48 the scorings from the various submodels are log-lin combined, using the various components of vector . that had been found in the training. Finally, in block 50 the target data are classified using the results from block 50. In block 52, the procedure is stopped when ready.

Figure 2:
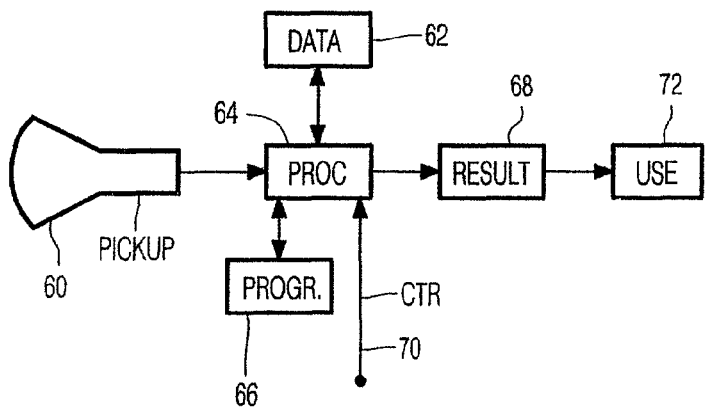
FIG. 2, a comprehensive system for practising the invention.

FIG. 2 shows a comprehensive system for practising the invention. The necessary facilities may be mapped on standard hardware, or on a special purpose machine. Item 60 is an appropriate pickup, such as a voice recorder, a two-dimensional optical scanner, together with A/D facilities and quality enhancing preprocessing if necessary. Block 64 represents the processing that applies programs from program memory 66 on data that may arrive from pickup 60, or from data storage 62, where they may have been stored permanently or transiently, after forwarding from pickup 60. Line 70 may receive user control signals, such as start/stop, and possibly training-supportive signals, such as for definitively disabling a non-contributory submodel.

Block 68 renders the recognition result usable, such as by tabulating, printing, addressing a dialog structure for retrieving a suitable speech answer, or selecting a suitable output control signal. Block 72 symbolizes the use of the recognized speech, such as outputting a speech riposte, opening a gate for a recognized person, selecting a path in a sorting machine, and the like.

The invention claimed is:

1. A method, operable on a processing system, for recognizing a pattern that corresponds to a set of physical stimuli, the processing system executing the steps of:
    transforming physical stimuli related to a target observation to yield a target pattern;
    providing a set of training observations;
    applying a plurality of association models to determine measuring values, wherein each relate to assigning a particular training observation to one or more associated pattern classes;
    setting a log/linear association distribution by combining all association models according to respective weight factors and joining a normalization quantity to produce a compound association distribution;
    optimizing said weight factors thereby minimizing a detected error rate of the actual assigning to said compound distribution;
    recognizing said target observation with the help of said compound distribution, wherein said optimizing step includes determining whether a particular association model improves a recognition score;
    performing a log/linear association of the scoring models by combining models using a vector determined from training; and
    classifying said target pattern using result from the preceding log/linear association step of the scoring models.

2. The method as claimed in claim 1, wherein said association model is a probability model, and said association distribution is a probability model for associating.

3. The method as claimed in claim 1, wherein said optimizing is effected through minimizing a training error rate in an iterative manner, wherein said error rate is expressed in a continuous and differentiable manner as a function of rivalry values of non-optimum assigning.

4. A method as claimed in claim 2, and applied to speech recognition, wherein said probability models comprise one or more of the set of: as language models: bigram, trigram, fourgram, as acoustic models: word-internal triphones, cross-word triphones, maximum likelihood linear regression adaptation models; as additional models: unigram, distance-1-bigram (the middle element being assumed don't care), pentaphones.

5. The method as claimed in claim 1, the processing system further executing the step of:

using only those association models that improve the recognition score.

6. The method as claimed in claim 1, wherein the set of physical stimuli is selected from a group consisting of: speech, audio, handwriting, photos and video images.

7. A method, operable on a processing system, for modeling an association distribution for patterns that correspond to a plurality of physical stimuli; said processing system executing the steps of:
    transforming physical stimuli to yield
    a set of training observations and through applying a plurality of association models ascertaining various measuring values, wherein each pertain to assigning a particular training observation to one or more associated pattern classes;
    determining a compound association distribution by using a log/linear association distribution to combine the association models using respective weight factors and a normalization quantity;
    optimizing said weight factors, wherein said optimizing step includes determining whether a particular association model improves a recognition score; and
    machine optimizing a vector for a best error rate.

8. A method, operable on a processing system, for recognizing a pattern that corresponds to a set of physical stimuli, said processing system executing the steps of:
    transforming physical stimuli related to a target observation to yield a target pattern;
    receiving a plurality of association models indicating various measuring values, wherein each pertain to assigning an observation to one or more associated pattern classes, as being combined in a log/linear association distribution according to respective weight factors, and joined thereto a normalization quantity to produce a compound association distribution;
    optimizing said weight factors;
    recognizing said target observation with the help of said compound distribution, wherein said optimizing step includes determining whether a particular association model improves a recognition score; and
    machine optimizing a vector for a best error rate.

9. A processing system being arranged for recognizing a pattern that corresponds to a set of physical stimuli, said processing system comprising:
    a means for transforming physical stimuli related to a target observation to yield a target pattern;
    a receiver means for receiving a body of training observations; and
    a processor configured to:
        (1) process a plurality of stored association models to ascertain various measuring values, wherein each pertain to assigning a particular training observation to one or more classes of patterns;
        (2) determine a compound association distribution by using a log/linear association distribution and combining at least a portion of the association models using respective weight factors and joining a normalization quantity;
        (3) optimize said weight factors; and
        (4) recognizing said target observation with the help of said compound distribution, wherein said optimizing include determining whether a particular association model improves a recognition score.

10. The system as claimed in claim 9, wherein the processor is further configured to:
    use only those association models that improve the recognition score.

11. A method, operable on a processing system, for recognizing a pattern that corresponds to a set of physical stimuli, said process system executing the steps of:
    transforming physical stimuli related to a target observation to yield a target pattern;
    providing a set of training observations;
    applying a plurality of association models to determine measuring values, wherein each relate to assigning a particular training observation to one or more associated pattern classes;
    using a log/linear association distribution by combining all association models according to respective weight factors and joining a normalization quantity to produce a compound association distribution;
    optimizing said weight factors thereby minimizing a detected error rate of the actual assigning to said compound distribution; and
    recognizing said target observation with the help of said compound distribution, wherein said optimizing step includes determining whether a particular association model improves a recognition score;
    wherein said optimizing is effected in a least squares method between an actual discriminant function as resulting from said compound distribution and an ideal discriminant function, as expressed on the basis of an error rate, whilst expressing the weight vector $\div 1$ in a closed expression as $\div 2 = Q^{-1} P$, wherein:
    Q: autocorrelation matrix of the discriminant functions of the various models
    P: correlation vector between the error rate and the discriminant functions.

* * * * *